United States Patent [19]

Aulick et al.

[11] Patent Number: 4,842,795
[45] Date of Patent: Jun. 27, 1989

[54] METHOD OF MAKING COINJECTION MOLDED DAISYWHEEL PRINTHEAD

[75] Inventors: Larry O. Aulick, Cynthiana; Charles L. DeCoste Jr., Lexington, both of Ky.

[73] Assignee: Internal Business Machines Corporation, Armonk, N.Y.

[21] Appl. No.: 78,324

[22] Filed: Jul. 27, 1987

[51] Int. Cl.[4] .............................................. B29C 45/16
[52] U.S. Cl. .................................... 264/155; 264/156; 264/255; 400/174; 425/130
[58] Field of Search ............... 264/255, 250, 156, 254, 264/45.1, 154, 155, 328.8; 425/130; 400/174

[56] References Cited

U.S. PATENT DOCUMENTS

| | | | |
|---|---|---|---|
| 3,935,937 | 2/1976 | Tramposch | 400/179 |
| 4,018,639 | 4/1977 | Staples Jr. | 156/73.1 |
| 4,165,189 | 8/1979 | Bauer | 400/144.2 |
| 4,391,537 | 7/1983 | Prest Jr. et al. | 400/174 |
| 4,609,516 | 9/1986 | Krishnakomar et al. | 264/255 |
| 4,715,802 | 12/1987 | Arai | 264/255 X R |

Primary Examiner—Jan H. Silbaugh
Assistant Examiner—Nick Krisch
Attorney, Agent, or Firm—John A. Brady

[57] ABSTRACT

A printhead is formed by injecting unfilled nylon by injection unit 1 and mineral filled nylon by injection unit 3. The filling adds impact resistance for printing, while the unfilled nylon is particularly resistant to flexural fatigue near the hub of the printwheel. Unit 1 is operated first to form an outer layer, with quantity limited so that the outer layer comes to about the middle of the arms of printheads. Unit 3 is then operated to form a core and to be the only material forming the character elements. The resulting printhead is durable and is capable of use at greater deflection than the same printhead made of only the impact resistant material.

12 Claims, 2 Drawing Sheets

METHOD OF MAKING COINJECTION MOLDED DAISYWHEEL PRINTHEAD

TECHNICAL FIELD

This invention relates to impact printhead of the daisywheel type. Daisywheel printheads have a hub supporting a circle of spokes with each spoke having an impact face on its end. Such a printing member must withstand flexure of the spokes during printing while having an impact face having raised parts defining characters which resist degradation during repeated use.

BACKGROUND ART

Strengthening of the spokes against flexure may be achieved by physically supporting the spokes, as with a ring adhesively connected to the spokes near the hub. Such physical additions constitute added manufacturing and materials expenses, and may unduly affect the resistance of the spokes to flexure in actual operation.

U.S. Pat. No. 4,018,639 to Staples, Jr. is illustrative of such a printhead in which the spokes are one, flexible material and the impact face is another material resistant to impact. The impact faces are separate elements or slugs which are attached to the spokes. The slugs are molded into the ends of the printhead spokes during manufacture. This printhead also has rings adhesively attached to alter the deflection properties of the spokes.

U.S. Pat. No. 3,935,937 to Tramposch similarly discloses detached character slugs. U.S. Pat. No. 4,165,189 to Bauer shows a molded daisywheel printhead in which the spokes are reinforced by ribs formed in them.

Two-shot molding in another known method of manufacturing printwheels with two different materials in the desired locations. Several commercially-sold printwheels appear to be made by two-shot molding, typically having a very hard material for the character faces. This method involves separate molds for injection of each material. After the first material is molded, (the character faces, for example) the resulting part is removed from the mold and inserted into a second mold. The second material is injected into this mold, forming the remaining sections of the printwheel.

This printwheel employs molding, but does not involve changing the form of the spokes. It is conventional to mold a daisywheel printhead in one piece, and the printhead in accordance with this invention is molded in one piece. This invention differs from known prior art in that the printhead is molded entirely from flowed material molded in place, but of materials of different characteristics. The outer material of the lower spokes is primarily resistant to flexure while the entire material of the outer impact faces is resistant to impact.

This is achieved by coinjection molding. Coinjection molding is standard in itself. It is used to achieve a product with a core of one material and an outer layer of another. In accordance with this invention, one of two different materials coninjected does not reach the outer areas of the mold, where the impact faces are formed. Coinjection in which one material does not reach the ends of the mold occurs in the prior art, but is considered a failure or is done for visual or cosmetic purposes. Similarly, injection molding is a standard process for manufacture of daisywheels. The impact-face material of the preferred embodiment of this invention is a mineral-fiber filled nylon which is the same material as that of printwheels widely sold by the assignee of this invention as the only material of daisywheel. This existing printwheel also has an adhesively attached ring as mentioned above, and it is to be mounted in a cartridge, which, of course, is not integrally molded with the daisywheel.

Injection molding two materials for visual or cosmetic purposes, as mentioned above, may be by interval injection molding (injecting in alternating sequence) or two component injection molding (injecting simultaneously with little control of the flow path of the materials, typically to obtain a somewhat random mixture). These are coinjected since different materials are injected from two injection units. Known examples include products in which only one of the injected materials reaches the outer portions of the final article. The purpose is to have an article with different colors, one known example being a leaf-shaped article with an internal brown material and an outer green material. This does not involve significant modification of mechanical properties and clearly does not suggest a coinjected daisywheel printhead with materials selected for their mechanical properties. In its more specific aspects, this invention involves coinjection molding of one material as an outer layer around a different material, except inner material extends out to the impact faces and is the only material at the impct faces. Two-component injection and interval injection molding typically do not involve a product having an outer layer around an inner material, and are not known to have been used to make an impact print element such as a daisywheel.

SUMMARY OF THE INVENTION

Two materials, for example, a filled and unfilled nylon are coinjection molded into a daisywheel printhead having a central hub and radial arms in the manner of spokes, the arms having integral impact faces in the form of symbols at their outer ends for printing, while the unfilled nylon is particularly resistant to flexural fatigue near the hub of the printwheel.

The coinjection unit and essential procedures may be conventional, with the quantities injected being selected so that one material does not reach the daisywheel impact faces. Each of the two injection units is filled with one of the two materials, an injection unit forming an outer layer of the product having the flexural-resistant material and the other unit having the impact-resistant material. The injection unit having unfilled nylon is operated first to form an outer layer. The quantity of the first operation is limited so that the flexural-resistant material will not occupy the end of the daisywheel. The second unit is then operated to form a core and to be the only material at the distant ends of the daisywheel, which are the character elements.

To achieve even location of the two materials around the printwheel, it had been found that the mold should not contain obstructions. Where holes are desired in the printwheel, as is often the case to receive detents during the operation and for optical tracking of the printwheel in a printer, the holes for drilled after the molding step.

The printwheel in accordance with this invention is potentially both cost-effective and reliable, since additional steps such as the application of a ring near the hub are avoided. The printwheel is capable of use at greater deflection than the same printwheel made of only the impact resistant material, and therefore may be displaced further from a printing line to provide good visibility during printing. The printwheel can have virtually the same form as existing printwheels and can be housed in the same cartridge.

BRIEF DESCRIPTION OF DRAWING

A detailed description of the preferred implementation of this invention is described below with reference to the drawing, in which.

BEST MODE FOR CARRYING OUT THE INVENTION

Figure 1:
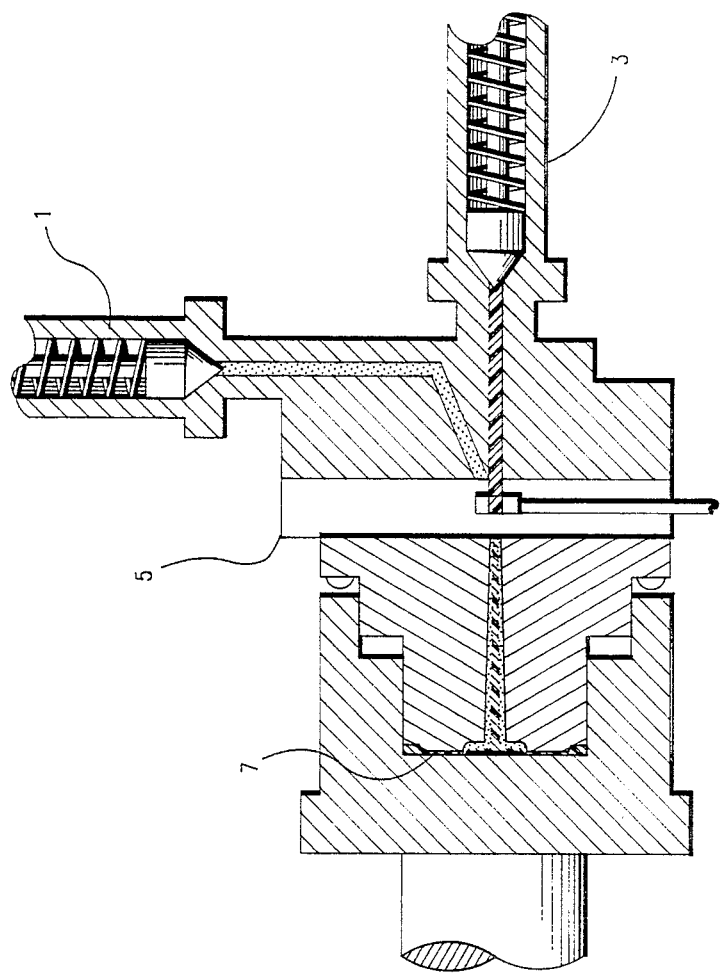
FIG. 1 is a schematic illustration of a cross section of a coinjection molding press as employed in accordance with this invention.

This preferred printwheel is molded using a known 75 ton coinjection molding press. The coinjection molding press differs from a conventional machine essentially in that there are separate injection units for each material. Pertinent parts are shown illustratively in FIG. 1. The press has a first injection unit 1 and a second injection unit 3.

During injection, the materials from each injection unit meet at a mixing cavity or head 5 before entering the mold 7. In this embodiment the mold is identical to the mold used to make the commercially sold printhead molded from one material mentioned above, although pins to form holes are removed, leaving a mold cavity with no obstructions. The mold 7 is clamped to the mixing head 5 by a conventional hydraulic clamping mechanism.

As is conventional for such co-injection molding, mixing head 5 has a symmetrical configuration as seen from injection unit 3, causing material from injection unit 3 to be surrounded by material from injection unit 1. (In FIG. 1, to distinguish the two materials in head 5, material from unit 1 is shown stippled while material from unit 3 is shown by slanted lines.) Mixing head 5 is a specialized control device having control valves. Details of such mixing units forms no part of this invention and, in fact, are not specifically known.

Injection unit 1 is loaded with unfilled nylon 6/6 a standard, commercial material, and injection unit 3 is loaded with nylon 6/6 with 40% by weight mineral filler, also a standard commercial material. Accordingly, in mixing head 5 unfilled nylon 6/6 surrounds filled nylon 6/6. (Typically, the mineral is a blend of calcium carbonate and clay and possibly other minerals.)

With mold 7 clamped to mixing head 5 and otherwise closed, the molding operation begins with the injection of material from injection unit 1 briefly first to form skin on the outside of the printwheel hub and spokes defined by mold 7. This is followed by injection simultaneously by unit 1 and unit 3. Injection from unit 1 is then subsequently terminated while injection from unit 3 is continued so that material from unit 3 breaks through the outer skin surface of the ends of the partial spokes being formed from the previous injection. This forms completed spokes having ends entirely of the mineral filled material from unit 3. Material from unit 3 also forms an inner core of the remainder of the printwheel. (Typical approximate times are 0.1 second of unit 1 alone, followed by 0.1-0.2 seconds of units 1 and 3 simultaneously, followed by 0.3 second of unit 3 alone.)

Figure 2:
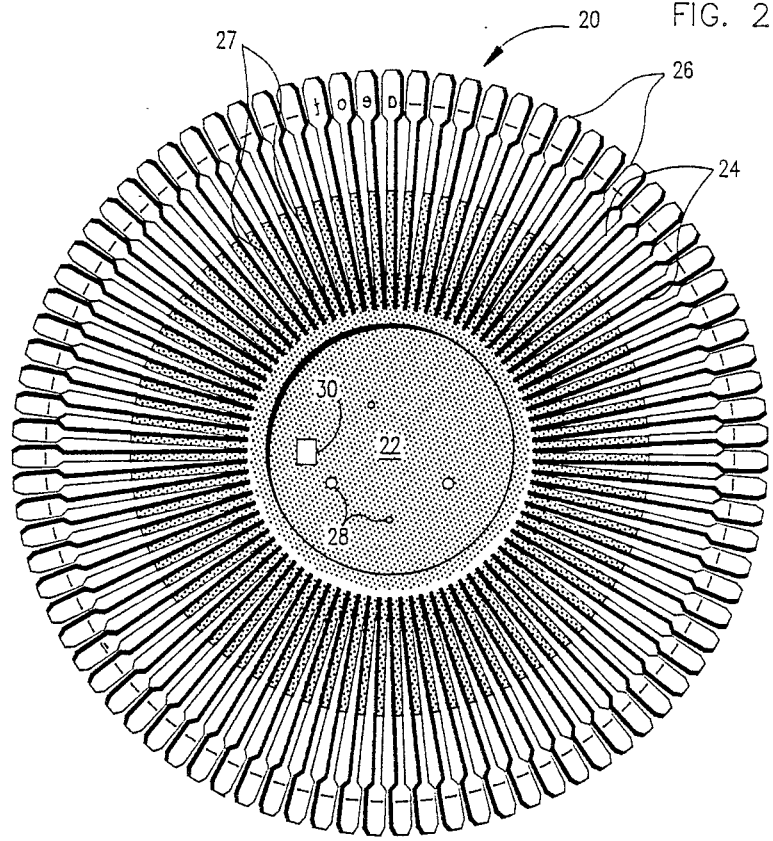
FIG. 2 illustrates a completed daisywheel in accordance with this invention. And, FIG. 3 is a cross sectional view of a spoke of a printwheel in accordance with this invention.

FIG. 2 illustrates the resulting product removed from the mold with sprue connection ground off, as is standard. Material from injection unit 1 is stippled in the drawing to differentiate it from material from injection unit 3. The printwheel 20 has a central hub 22 and arms or spokes 24 surrounding the hub 22. At least the lower final 5 millimeters in length 26 of each spoke 24 is of material injected from both injection unit 1 and from injection unit 3. Material only from injection unit 3 forms all of the impact faces 27, which have raised ridges in the form of characters, and typically about the outer one-half of spokes 24. The design objective is to assure that the more flexible material exists near hub 22 while none extends to the character faces 27, and very sharp tapering appears at the region where the outer material terminates.

Molding parameters are generally standard, using processing conditions, including processing temperatures and drying conditions, recommended by the manufacturer of the nylon materials employed. (The mold temperature is 120° to 140° F., and the stock temperature, i.e. at the entry of the mixing cavity, is 530°-570° F.) Residual moisture level is not important to coinjection molded printwheels since the fatigue life appears adequate through the entire range of moisture content.

The final printhead 20 has holes 28 and square opening 30 extending entirely through the hub 22. These are shown in dotted outline in FIG. 2 because in actual manufacture the hub 22 is continuous at the time of coinjection. This permits the two injected materials to flow approximately the same distance out for each of the spokes 24. If mold 7 has obstructions to form holes 28 and opening 30 during molding, outer material from injection unit 1 travels much further (typically, to the end of the spokes 24) in the area immediately past the obstructions, while spokes 24 close to those where the the outer material traveled further generally show a decrease in travel of the outer material. To avoid such unsymmetrical results, holes 28 and square openings 30 are machined (drilled or stamped, for example) into hub 22 after the molding operations.

Figure 3:
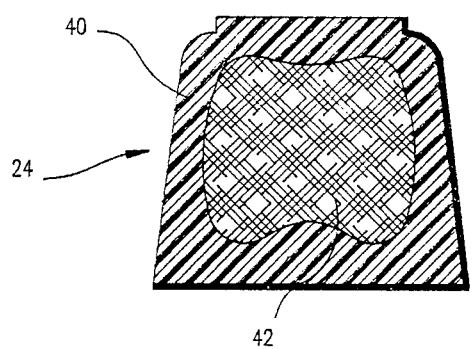

FIG. 3 shows a cross-section of a typical spoke 24 taken near hub 22. Each spoke 24 has an outer, surrounding region 40 of material from injection unit 1 and an inner core of material 42 from injection unit 3. The unreinforced nylon forms a fatigue-resistant skin in the highly stressed areas of the printwheel 20, which are near hub 22. The mineral-filled nylon provides printwheel finger stiffness and character abrasion resistance. This provides a printwheel with materials of the desired properties at the two essential areas of stress, the character faces and the spoke locations of highest bending stress.

The filled nylon making up all of the character faces is the same material which makes up all of the commercially sold daisywheel printhead mentioned above. Thus, character broadening and other degradation during use should not be impaired by the coinjection, since the filled nylon in the character faces is identical to that of the commercially sold daisywheel. (Differences which do occur are thought to result from variations in manufacturing conditions which can be eliminated by consistent, well-controlled manufacturing techniques.)

In use, of course, the spokes 24 are bent in the conventional manner perpendicular to hub 22 so as to impact the raised character onto a paper or record sheet supported on a solid support element or platen. Such use flexes spokes 24 repeatedly, which tends to cause spokes 24 to break and change in response to the impacts. An adhesively attached ring, often called a damping ring, positioned on spokes 24 near hub 22 has been used to distribute these flexing forces so as to prevent breakage and change of response of spokes 24. No damping ring or other added member is employed with this coinjected daisywheel to prevent damage from flexure. Instead the different modulus of elasticity of the outer skin in the area of flexure prevents breakage. The average coinjected printwheel of the preferred embodiment typically is expected to perform without breakage through a period of 5 years (or 15 million characters).

In addition to spoke failure from breakage, change of impact response of the spokes, and character broadening from deformation, other concerns include printwheel warpage and acoustics. Such remaining concerns are also thought to result from variations in manufacturing conditions which can be controlled by consistent, well-controlled manufacturing techniques.

This preferred daisywheel requires about 32% less force to deflect the spokes 24 for printing compared to the corresponding printwheel made entirely from filled nylon. Similarly, when used for printing in the same printing system, this preferred daisywheel impacted the platen with about 20% more force than that of the corresponding printwheel made entirely from filled nylon, and print samples showed no significant differences in print quality.

Moreover, the spokes may be deflected at least $\frac{1}{3}$ more than the deflection of the corresponding printwheel made entirely from filled nylon. The deflection may be up to 300 mils (approximately 0.762 cm). This permits machine design with the printwheel further back from the print line, thereby improving visibility of printing during printing. This high deflection appears to have no effect on the life of the printwheel with respect to breakage or other fatigue failure.

However, actual coinjected printwheels tended to be more warped than the corresponding printwheels made entirely of filled nylon, which created more noise from printwheel rubbing beyond that of corresponding printwheels made of filled nylon. Also, the actual coinjected printwheels had characters broadened beyond desired limits during high levels of repetitive use, although their impact force did not change. The foregoing imperfections are considered to result from details in manufacturing which can be eliminated by optimization of standard manufacture, along with consistent and careful control of process temperatures and cooling rates.

Variations of this invention will be apparent to those skilled in the art and other variations within the spirit and scope of this invention may be anticipated. Accordingly, the following claims are made seeking coverage within their true scope and as provided by law.

What is claimed is:

1. A process for manufacturing a print element having a central hub and flexible spokes attached to the hub, each of said spokes having an outer end, with said outer end of said spokes having raised regions forming symbols for impact printing, comprising forming said element by conjection molding including injecting into a mold of said element a first material to form an outer layer of said element resistant to flexural fatigue during impact printing in an amount not reaching said symbols and separately injecting into said mold a second material to form a core of said element and to extend past said first material to form all of said outer ends having impact resistance during impact printing by said raised regions.

2. The process as in claim 1 in which said material forming said outer layer is injected first, and then said material forming said core is injected.

3. The process as in claim 2 in which said hub is continuous and in which said element is removed from said mold and then at least one opening in said hub is formed through said hub.

4. The process as in claim 1 in which said hub is continuous and in which said element is removed from said mold and then at least one opening in said hub is formed through said hub.

5. The process as in claim 4 in which said material forming an outer layer is unfilled nylon and said material forming a core and extending to said outer ends is filled nylon.

6. The process as in claim 1 in which said material forming an outer layer is unfilled nylon and said material forming a core and extending to said outer ends is filled nylon.

7. The process as in claim 2 in which said material forming an outer layer is unfilled nylon and said material forming a core and extending to said outer ends is filled nylon.

8. The process as in claim 3 in which said material forming an outer layer is unfilled nylon and said material forming a core and extending to said outer ends is filled nylon.

9. The process of forming a daisywheel print element having a central hub and flexible spokes attached to said hub, each of said spokes having an outer end, with said outer end of said spokes having raised characters for impact printing, comprising forming said element by coinjection molding including injecting an unfilled polymer into a mold of said element to form an outer layer of said element resistant to flexural fatigue during impact printing in an amount not reaching said characters and separately injecting into said mold said polymer filled with a mineral to from a core of said element and to extend past said unfilled polymer to form all of said outer ends having impact resistance during impact printing by said raised characters.

10. The process as in claim 9 in which said unfilled polymer is injected and then said filled polymer is injected.

11. The process as in claim 10 in which said polymer is nylon.

12. The process as in 9 in which said polymer is nylon.

* * * * *